June 30, 1931.  E. ANDRE  1,811,906
BAND SAW GUARD
Filed May 4, 1928
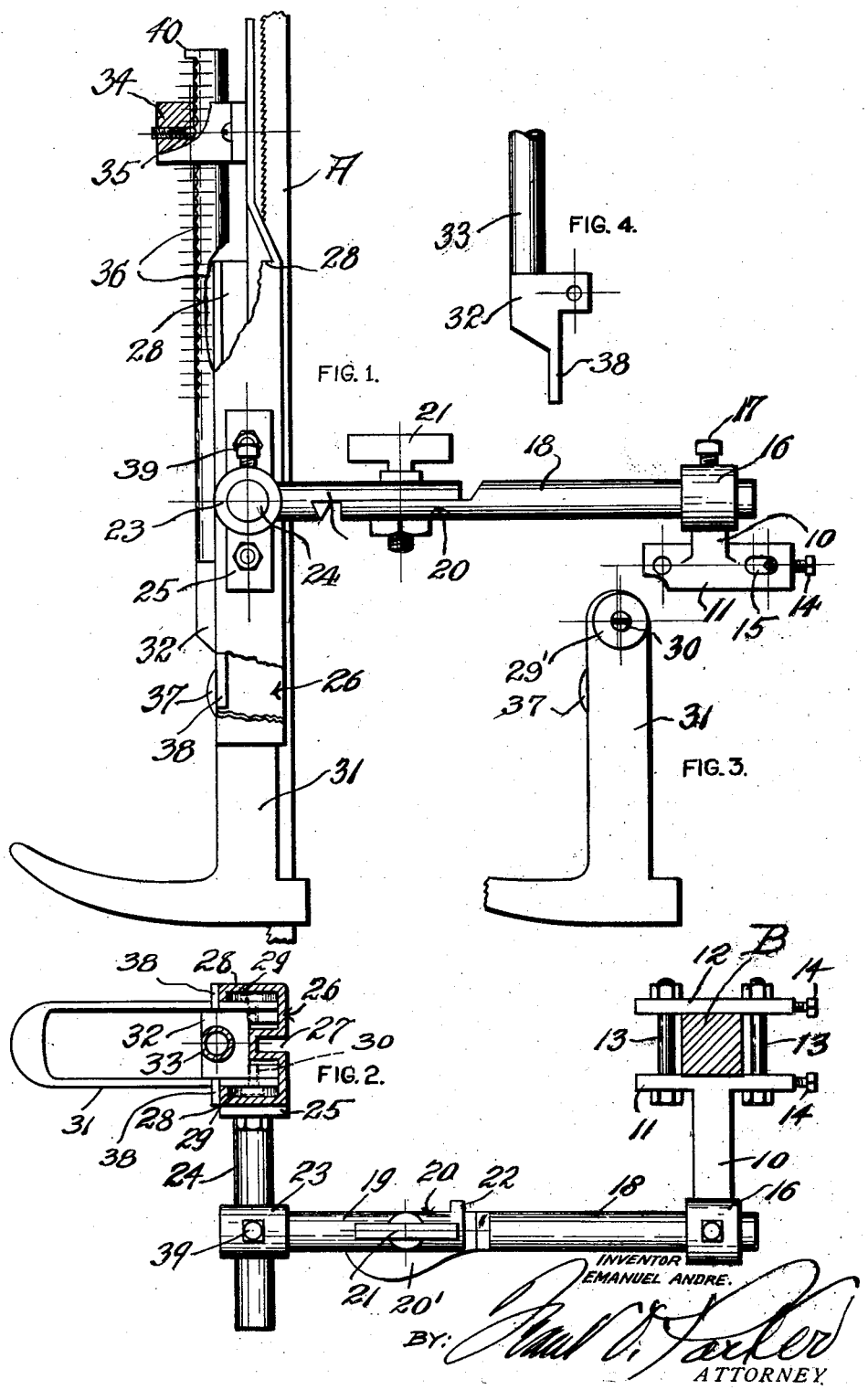

Patented June 30, 1931

1,811,906

UNITED STATES PATENT OFFICE

EMANUEL ANDRE, OF GREEN BAY, WISCONSIN

BAND SAW GUARD

Application filed May 4, 1928. Serial No. 275,025.

The invention relates to saw guards, and more particularly to band saw guards.

The primary object of the invention is the provision of a guard of this character, wherein its mounting permits the same to be positioned relative to the band saw to properly align therewith and is adjustable with relation to the work support and the work to be sawed so that at all times the operator will be protected against injury during the travel of the band saw when the same is active.

Another object of the invention is the provision of a guard of this character, wherein the same is provided with a foot which can swing to and from the band saw and may be raised and lowered relative to the work and automatically latched in its adjusted position.

A further object of the invention is the provision of a guard of this character, wherein the same can be swung to and from the work as a whole and when in position to protect an operator can be made fast so as to properly and efficiently guard the saw band.

A still further object of the invention is the provision of a guard of this character, wherein the swinging foot is eccentrically mounted so as to gravitate in the direction of the saw band when the guard as a whole is in working position relative to the band saw.

A still further object of the invention is the provision of a guard of this character, which is comparatively simple in construction, readily and easily applied to a band saw frame, quickly set in working position with respect to the saw, thoroughly reliable and efficient in its purpose, strong, durable, readily and conveniently adjusted, and inexpensive to manufacture.

With these and other objects in view the invention consists in the features of construction, combination and arrangement of parts as will be hereinafter more fully described, illustrated in the accompanying drawings showing the preferred embodiment of the invention, and pointed out in the claims hereunto appended.

In the accompanying drawings:

Figure 1 is a vertical side elevation of a guard constructed in accordance with the invention, showing a portion of a band saw in association therewith, a portion of the guard being broken away.

Figure 2 is a top plan view of the supporting brackets for the guard, a portion of the latter being shown in transverse section.

Figure 3 is a detail elevation of the swinging foot of the guard.

Figure 4 is a fragmentary side elevation of the adjustable supporting post of the foot, the latter being detached.

Similar reference characters indicate corresponding parts throughout the several views in the drawing.

Referring to the drawings in detail, A, designates a portion of a band saw, and B, a vertical upright which is rearwardly of and directly behind said band saw, the upright being a part of the frame of the saw machine, which is of any conventional type. The band saw A, is shown clearly in Figure 1, of the drawings, while the upright B is shown in Figure 2, of the same.

Adapted to be adjustably clamped upon the upright B is a hanger 10, formed with a flat cross base 11, resting against one side of the upright, while at the other side of the latter is a companion plate 12, through which are passed securing bolts 13, these also being passed through the base 11. Working against these bolts 13, are set screws 14, each protruding into a slot 15, in the respective base and plate for one of the bolts, so that the hanger can be minutely set upon the upright, as will be obvious.

The outer end of the hanger 10, is formed with a collar head 16, having a set screw 17, and in this head is inserted the inner member 18, of an adjustable arm, the outer member 19, of the latter being adjustably coupled with the member 18 through the medium of an overlap break-joint 20, including a winged set screw 21 engaged therein. The member 18, has a flared terminal 20', coincident with the break-joint 20, to serve as a turn-table for the member 19, as will be apparent. The member 19, is provided with a stop lug 22, which limits its swinging and the alignment thereof with the member 18.

The member 19, is provided with a collar head 23, in which is engaged the stud 24, of a bracket 25, bolted or otherwise secured to a breast plate 26, of the saw guard herein after fully described.

The breast plate 26, of the guard is formed with a longitudinal channel 27, for the saw band A, while at opposite sides of the plate are vertical guide tracts 28, these being spaced apart and in which the travel anti-friction rollers 29, carried on the pivot 30, of a swinging foot 31, this being illustrated in detail in Figures 1, 2 and 3, of the drawings. The foot straddles and is swingingly connected eccentrically by the pivot 30, to the lower block-like end 32, of a tubular or semi-tubular adjusting stem or post 33, disposed parallel with the breast plate 26. The stem or post 33 is slidably engaged in a bearing 34, secured to the plate 26, near its upper end. In this bearing is fitted a spring pressed latching element 35, to engage in any one of a series of notches 36, formed in the outer face or surface of the stem or post 33, so that the latter can be automatically latched when shifted vertically to the desired elevated or lowered positions.

The foot 31 by reason of its eccentric pivotal mounting will gravitate in the direction of the band saw A, as will be apparent, yet the same can be swung reversely away from said saw. This foot 31 as usual rides upon the work to be sawed while placed upon the bed of the sawing machine. The foot 31 is provided with a stop 37 in the form of a cross-web, which contacts with a depending tongue 38 in the path thereof, on the end 32 of the stem or post 33, and also with the sides of the breast plate 26, so as to limit the movement of said foot toward the saw band.

The collar head 23 of the bracket 25, is provided with a set screw 39, so that the breast plate can be secured in adjusted position with relation to the saw band A, as will be obvious.

The break-joint 20 permits the guard to be swung toward or away from the saw band A, while the arm including the members 18 and 19 will permit the guard to be adjusted close to or the required distance removed from the said saw band. The band A, of the sawing machine is completely shielded by the guard when the latter is in working position on the machine.

The stem or post 33 at its upper end is provided with a stop lug 40, to coact with the bearing so as to limit the downward movement of said stem or post therein.

It will be seen that the guard can be accurately adjusted relative to the material to be sawed so that the foot 31 will be the right distance from the work supporting bed of the machine and to glide over said material during the sawing operation.

What is claimed is:

1. A band saw guard comprising a breast plate adapted to confront a saw band, means for adjustably supporting the plate in confronting relation to said band, a post adjustably connected with the plate forwardly of the same, and a foot eccentrically pivoted to the lower end of the post to gravitate in the direction of the saw band.

2. A band saw guard comprising a breastplate having a channel therein for accommodating a saw band, means for adjustably supporting the plate in confronting relation to the band, a post, a bearing on the upper portion of the plate and adjustably receiving the post, and a swinging foot connected with the lower end of the post.

3. A band saw guard comprising a breast plate having a channel therein for accommodating a saw band, means for adjustably supporting the plate in confronting relation to the band, a post, a bearing on the upper portion of the plate and adjustably receiving the post, means for frictionally latching the post in the bearing, and a swinging foot connected with the lower end of the post.

4. A band saw guard comprising a breast plate for partially enclosing a saw band, a swinging foot having means slidably connected with the plate and adapted to gravitate toward the band, and means for latching the first named means in adjusted position with respect to the plate.

5. A band saw guard comprising a breast plate for partially enclosing a saw band, a foot adapted to gravitate toward the band, means carrying the foot and adjustably associated with the plate for raising and lowering said foot, means for latching the said means in adjusted relation to the breast plate, and means for limiting the swinging movement of the foot in the direction of the band.

6. A band saw guard comprising a breast plate for partially enclosing a saw band, a foot adapted to gravitate toward the band, means carrying the foot and adjustably associated with the plate for raising and lowering the said foot, means for latching the means in adjusted position relative to the plate, means for limiting the swinging movement of the foot in the direction of the band, and means for adjustably supporting the breast plate relative to the saw band.

7. A band saw guard comprising a breast plate for partially enclosing a saw band, a post, means connecting the post with the plate, a swinging foot connected with the post, and means for holding the post in adjusted position and permitting raising and lowering of the foot.

In testimony whereof I affix my signature.

EMANUEL ANDRE.